United States Patent
Araki et al.

(10) Patent No.: US 11,728,475 B2
(45) Date of Patent: Aug. 15, 2023

(54) LITHIUM-ION SECONDARY BATTERY POSITIVE ELECTRODE ACTIVE MATERIAL COMPLEX, LITHIUM-ION SECONDARY BATTERY POSITIVE ELECTRODE, AND LITHIUM-ION SECONDARY BATTERY

(71) Applicant: HONDA MOTOR CO., LTD., Tokyo (JP)

(72) Inventors: Kazuhiro Araki, Saitama (JP); Taku Matsuzaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 17/165,967

(22) Filed: Feb. 3, 2021

(65) Prior Publication Data

US 2021/0257610 A1 Aug. 19, 2021

(30) Foreign Application Priority Data

Feb. 18, 2020 (JP) .................................. 2020-025278

(51) Int. Cl.
| | | |
|---|---|---|
| H01M 4/36 | (2006.01) | |
| H01M 4/525 | (2010.01) | |
| H01M 4/505 | (2010.01) | |
| H01M 4/58 | (2010.01) | |
| H01M 10/0525 | (2010.01) | |
| H01M 4/02 | (2006.01) | |

(52) U.S. Cl.
CPC ........... *H01M 4/366* (2013.01); *H01M 4/505* (2013.01); *H01M 4/525* (2013.01); *H01M 4/5825* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2011/0223482 A1 | 9/2011 | Fujii et al. | |
| 2012/0213920 A1* | 8/2012 | Yanagita | H01M 4/505 |
| | | | 427/126.6 |
| 2020/0127283 A1* | 4/2020 | Araki | H01M 4/525 |
| 2020/0161632 A1 | 5/2020 | Yamashita et al. | |

FOREIGN PATENT DOCUMENTS

| | | | |
|---|---|---|---|
| CN | 108878859 A | * | 11/2018 |
| JP | 2013077420 A | * | 4/2013 |
| WO | 2010053174 A1 | | 5/2010 |
| WO | 2018221263 A1 | | 12/2018 |

* cited by examiner

*Primary Examiner* — Carlos Barcena
(74) *Attorney, Agent, or Firm* — CKC & Partners Co., LLC

(57) ABSTRACT

A lithium-ion secondary battery positive electrode active material complex, a lithium-ion secondary battery positive electrode, and a lithium-ion secondary battery using the lithium-ion secondary battery positive electrode containing the lithium-ion secondary battery positive electrode active material complex are provided so that a lithium-ion secondary battery having high output properties, excellent durability, and a high energy density can be attained.

A positive electrode active material for a lithium-ion secondary battery contains a complex in which a surface of a first positive electrode active material made of a lithium transition metal complex oxide containing nickel is covered with a covering layer containing an olivine type second positive electrode active material on a surface of which carbon is carried and a carbon nanotube.

4 Claims, No Drawings

LITHIUM-ION SECONDARY BATTERY POSITIVE ELECTRODE ACTIVE MATERIAL COMPLEX, LITHIUM-ION SECONDARY BATTERY POSITIVE ELECTRODE, AND LITHIUM-ION SECONDARY BATTERY

This application is based on and claims the benefit of priority from Japanese Patent Application No. 2020-025278, filed on 18 Feb. 2020, the content of which is incorporated herein by reference.

BACKGROUND OF THE INVENTION

Field of the Invention

The present invention relates to a lithium-ion secondary battery positive electrode active material complex, a lithium-ion secondary battery positive electrode, and a lithium-ion secondary battery using the lithium-ion secondary battery positive electrode containing the lithium-ion secondary battery positive electrode active material complex.

Related Art

Conventionally, a lithium-ion secondary battery has been widely used as a secondary battery having a high energy density.
A lithium-ion secondary battery using liquid as an electrolyte has a structure in which a separator is present between a positive electrode and a negative electrode and the lithium-ion secondary battery is filled with an electrolyte (an electrolytic solution) in the form of liquid.

The electrolytic solution of the lithium-ion secondary battery is normally a flammable organic solvent, and for this reason, there has particularly been a problem in safety against heat.

Thus, a solid-state battery using a flameproof electrolyte in the form of solid instead of the organic liquid electrolyte has also been proposed (see Patent Document 1).

The solid-state secondary battery includes, between a positive electrode and a negative electrode, an inorganic solid electrolyte, an organic solid electrolyte, or a gel solid electrolyte as an electrolyte layer.

As compared to the battery using the electrolytic solution, the solid-state battery using the solid electrolyte can solve the heat problem, and can have a higher capacity and/or a higher voltage. Further, the solid-state battery can meet a demand for compactness.

It has been known that such a lithium-ion secondary battery can be, as a battery having a high energy density, attained by using high-nickel-concentration lithium-containing transition metal oxide as a positive electrode active material.

However, in a positive electrode containing, as the positive electrode active material, the high-nickel-concentration lithium-containing transition metal oxide, oxygen desorbs from an active material surface due to, e.g., a charge/discharge cycle, and inactive NiO is generated on the active material surface.

NiO interferes with diffusion of lithium ions, and for this reason, battery durability is degraded due to generation of NiO on the active material surface. As a result, degradation of the output of the battery is caused.

For this reason, a positive electrode material in which a surface of a positive electrode active material containing high-nickel-concentration lithium-containing transition metal oxide is covered with a lithium-based polyanion on a surface of which carbon is carried has been proposed (see Patent Document 2).

According to the positive electrode material described in Patent Document 2, the high-nickel-concentration lithium-containing transition metal oxide is coated with the lithium-based polyanion, and therefore, the area of direct contact between an electrolytic solution and the positive electrode active material containing the high-nickel-concentration lithium-containing transition metal oxide is reduced.

As a result, generation of inactive NiO is reduced, and a lithium-ion secondary battery having improved high-temperature cycle properties can be obtained.

However, due to a Jahn-Teller effect of $Mn^{3+}$ in a $Mn^{3+}PO^4$ system in the $LiMnPO_4$-based material as described in Patent Document 2, there are basically polaron hole trap in charge transfer and an increase in a charge transfer potential barrier due to mismatch at a $MnPO_4/LiMiPO_4$ interface.

For this reason, a resistance increase is caused, and overvoltage is applied to the positive electrode active material. As a result, deterioration is accelerated.

As a practical issue, e.g., a failure to satisfy required vehicle output is caused.

Patent Document 1: PCT International Publication No. WO2010/053174
Patent Document 2: PCT International Publication No. WO2018/221263

SUMMARY OF THE INVENTION

The present invention has been made in view of the above-described background art, and an object of the present invention is to provide a lithium-ion secondary battery positive electrode active material complex, a lithium-ion secondary battery positive electrode, and a lithium-ion secondary battery using the lithium-ion secondary battery positive electrode containing the lithium-ion secondary battery positive electrode active material complex so that a lithium-ion secondary battery having high output properties, excellent durability, and a high energy density can be attained.

Intense study has been conducted by the inventors of the present invention for solving the above-described problems. The inventors of the present invention have found that the above-described problems can be solved if a positive electrode active material for a lithium-ion secondary battery contains a complex in which a surface of a first positive electrode active material made of lithium transition metal complex oxide containing nickel is covered with a covering layer containing an olivine type second positive electrode active material on a surface of which carbon is carried and a carbon nanotube, and has arrived at the present invention.

That is, the present invention relates to a positive electrode active material complex for forming a positive electrode of a lithium-ion secondary battery, the positive electrode active material complex including a first positive electrode active material and a covering layer covering the first positive electrode active material. The first positive electrode active material is lithium transition metal complex oxide containing nickel. The covering layer contains a second positive electrode active material and a carbon nanotube. The second positive electrode active material is olivine type phosphorus oxide on a surface of which carbon is carried.

The first positive electrode active material may be lithium nickel cobalt-based oxide represented by formula (1) below.

$$LiNi_xCo_yM_zO_2 \qquad (1)$$

In the formula, M is at least one selected from Mn, Al, Mg, and W, x+y+z=1, 0.6≤x<1, 0.02≤y≤0.2, and 0.02≤z≤0.2.

The second positive electrode active material may be a lithium vanadium phosphate compound.

The second positive electrode active material may be at least one selected from a group consisting of LiVP$_2$O$_7$, Li$_3$V$_2$(PO$_4$), and LiVPO$_4$F.

Another aspect of the present invention is a lithium-ion secondary battery positive electrode including the above-described lithium-ion secondary battery positive electrode active material complex.

Still another aspect of the present invention is a lithium-ion secondary battery including a lithium-ion secondary battery positive electrode containing the above-described lithium-ion secondary battery positive electrode active material complex, a negative electrode, and an electrolyte.

According to the lithium-ion secondary battery positive electrode active material complex of the present invention, a lithium-ion secondary battery having high output properties, excellent durability, and a high energy density can be attained.

DETAILED DESCRIPTION OF THE INVENTION

Hereinafter, the present invention will be described. Note that a description below will be made as an example of the present invention, and the present invention is not limited to the description below.

<Lithium-Ion Secondary Battery Positive Electrode Active Material Complex>

A lithium-ion secondary battery positive electrode active material complex of the present invention is a complex including a first positive electrode active material and a covering layer covering the first positive electrode active material.

A battery to which the lithium-ion secondary battery positive electrode active material complex of the present invention is applicable is not particularly limited.

Such a battery may be a liquid lithium-ion secondary battery including an electrolyte in the form of liquid or a solid-state battery including an electrolyte in the form of solid or gel. In the case of application to the battery including the electrolyte in the form of solid or gel, the electrolyte may be an organic or inorganic electrolyte.

[First Positive Electrode Active Material]

The first positive electrode active material as a constituent component of the lithium-ion secondary battery positive electrode active material complex of the present invention is lithium transition metal complex oxide containing nickel.

As long as nickel and lithium are contained as constituent metal elements, the present invention is not particularly limited, and a well-known material can be used as the positive electrode active material of the lithium-ion secondary battery.

Thus, examples of the first positive electrode active material used in the present invention include oxide containing lithium and nickel as constituent metal elements and oxide containing at least one of other metal elements in addition to lithium and nickel as constituent metal elements.

Examples of the metal elements other than lithium and nickel include Co, Mn, Al, Cr, Fe, V, Mg, Ca, Na, Ti, Zr, Nb, Mo, W, Cu, Zn, Ga, In, Sn, La, and Ce, and not only one of these elements but also two or more of these elements may be contained.

The examples of the first positive electrode active material used in the present invention include lithium nickel cobalt-based oxide represented by general formula (1) below.

Lithium-containing transition metal oxide with a high nickel concentration forms a high-capacity active material so that a lithium-ion secondary battery with a high energy density can be attained.

$$LiNi_xCo_yM_zO_2 \quad (1)$$

In the formula, M is at least one selected from Mn, Al, Mg, and W, x+y+z=1, 0.6≤x<1, 0.02≤y≤0.2, and 0.02≤z≤0.2.

More specifically, the examples of the first positive electrode active material used in the present invention include lithium nickel cobalt aluminum-based oxide (NCA) represented by general formula (2) below.

$$Li_tNi_{1-x-y}Co_xAl_yO_2 \quad (2)$$

In the formula, 0.95≤t≤1.15, 0≤x≤0.3, 0.1≤y≤0.2, and x+y<0.5.

Examples of a first positive electrode active material used in another aspect of the present invention include lithium nickel cobalt manganese-based oxide (NCM) expressed by general formula (3) below. The NCM is preferred as the first positive electrode active material used in the present invention in terms of a high energy density per volume and excellent thermal stability.

$$LiNi_aCo_bMn_cO_2 \quad (3)$$

In the formula, 0<a<1, 0<b<1, and 0<c<1, and a+b+c=1 is satisfied.

The average particle size of the first positive electrode active material is not particularly limited, but is preferably within a range of 4 to 10 μm.

When the average particle size is within the range of 4 to 10 μm, higher output can be attained, and the present invention can be suitably applied to, e.g., an automobile.

[Covering Layer]

In the lithium-ion secondary battery positive electrode active material complex of the present invention, the covering layer covering the above-described first positive electrode active material includes a second positive electrode active material and a carbon nanotube. As long as the covering layer contains the second positive electrode active material and the carbon nanotube as essential components, the covering layer may contain other components as necessary.

[Second Positive Electrode Active Material]

The second positive electrode active material as the constituent component of the covering layer Is an olivine type phosphorus oxide on a surface of which carbon is carried.

(Olivine Type Phosphorus Oxide)

As the olivine type phosphorus oxide, a lithium vanadium phosphate compound is preferred.

In the lithium vanadium phosphate compound, oxygen forms a covalent bond to phosphorus, and therefore, no oxygen is generated even under a high-temperature environment.

Thus, the lithium vanadium phosphate compound is contained as the second positive electrode active material so that a high level of safety can be obtained.

The lithium vanadium phosphate compound containing vanadium as central metal also has a potential as a positive electrode of a multielectron reaction system.

Further, the olivine type lithium vanadium phosphate compound may form an active material having 50% or higher of the total capacity in a potential range of 4.2 to 4.1 V.

The active material having 50% or higher of the total capacity in the potential range of 4.2 to 4.1 V is a high-potential active material.

Thus, the high-potential olivine type active material is used as the second positive electrode active material and the first positive electrode active material as the high-capacity lithium-containing transition metal oxide is covered with the second positive electrode active material, and therefore, direct contact of a first positive electrode active material surface with an electrolytic solution can be prevented and oxygen desorption from the first positive electrode active material surface can be reduced.

At a high potential easily inducing alteration of the active material surface, a lithium ion is first taken in by the second positive electrode active material, and therefore, damage to the first positive electrode active material can be avoided.

As a result, a high-output high-energy-density lithium-ion secondary battery with excellent durability can be attained.

Examples of the lithium vanadium phosphate compound preferably used as the second positive electrode active material include $LiVP_2O_7$ and $Li_3V_2(PO_4)_3$ referred to as LVP and $LiVPO_4F$ referred to as LVPF. In the present invention, not only one type but also two or more types may be mixed and used as the second positive electrode active material.

Note that V and/or Li in general formulas of the LVP and the LVPF described above may be partially substituted for a metal element such as Fe, Al, Cr, Mg), Mn, Ni, or Ti.

A slight amount of other anions such as $(BO_3)$, $(WO_4)$, $(MoO_4)$, and $(SiO_4)$ may be dissolved in a phosphate $(PO_4)$ portion.

Note that as compared to the LVP, the LVPF has a higher voltage and a higher capacity.

Thus, in the present invention, in a case where the LVPF is used as the second positive electrode active material, a higher-energy-density battery can be attained.

Thus, $LiVPO_4F$ is most preferred as the second positive electrode active material used in the present invention.

The average particle size of the second positive electrode active material is not particularly limited, but is preferably within a range of 0.1 to 1 μm.

When the average particle size is within the range of 0.1 to 1 μm, the first positive electrode active material is easily covered by a mechanical method.

[Amount of Coverage with Second Positive Electrode Active Material]

In the lithium-ion secondary battery positive electrode active material complex of the present invention, the amount of coverage of the first positive electrode active material with the second positive electrode active material is preferably 1 to 15% by mass with respect to the total mass of the first positive electrode active material and the second positive electrode active material.

More preferably, the coverage amount is 1 to 10% by mass.

When the amount of coverage with the second positive electrode active material with respect to the total mass of the first positive electrode active material and the second positive electrode active material is 1 to 15% by mass, degradation in the energy density can be reduced while the effect of improving the durability of the obtained lithium-ion secondary battery and enhancing the input/output of the obtained lithium-ion secondary battery is maintained.

(Carbon)

The carbon carried on the surface of the olivine type phosphorus oxide as the second positive electrode active material is not particularly limited as long as the carbon is conductive carbon having electron conductivity.

The olivine type phosphorus oxide as the second positive electrode active material generally has a low electric conductivity, and therefore, the carbon is carried on the surface so that conductive properties can be improved and the output of the obtained lithium-ion secondary battery can be improved.

The type of carbon carried on the surface of the second positive electrode active material is not particularly limited, and examples thereof may include furnace black, Ketjen black, and acetylene black.

An average particle size is not particularly limited, but is preferably within a range of 20 to 50 nm.

When the average particle size of the carried carbon is within the range of 20 to 50 nm, an electrode having a high electron conductivity with a small weight can be obtained.

The coverage of the second positive electrode active material surface with the carbon is preferably 0.1 to 5.0% by mass with respect to the total mass of the second positive electrode active material and the carbon.

More preferably, the coverage is 1.0 to 2.0% by mass.

In a case where the coverage of the second positive electrode active material surface with the carbon is less than 0.1% by mass with respect to the total mass of the second positive electrode active material and the carbon, conductive properties of the positive electrode are degraded, and for this reason, the resistance of the obtained battery increases.

On the other hand, in a case where the coverage exceeds 5.0% by mass, the carton does not contribute to battery reaction, and for this reason, the capacity of the electrode decreases.

The method for carrying the carbon on the second positive electrode active material surface is not particularly limited. For example, the carbon can adhere or bond to the second positive electrode active material surface by a mechanical method or a chemical method.

A method in which a mixed organic solvent is reduced in the process of firing the second positive electrode active material and the surface is covered with the carbon is also conceivable.

The mechanical method is not particularly limited, and examples thereof include a method in which the carbon adheres or bonds to the second positive electrode active material surface by mechanical milling.

Alternatively, processing may be performed by a method selected from a group consisting of mechanofusion, planetary mixing, and kneading.

The chemical method is not particularly limited, and examples thereof include a chemical vapor deposition method (a CVD method) and a physical vapor deposition method.

[Carbon Nanotube]

The covering layer includes the carbon nanotube as the essential constituent component.

The carbon nanotube is present in the covering layer covering the first positive electrode active material, and therefore, the resistance of the formed lithium-ion secondary battery positive electrode decreases. As a result, the internal resistance of the obtained lithium-ion secondary battery can be decreased, and a lithium-ion secondary battery with excellent durability can be attained.

The carbon nanotube forming the covering layer of the present invention is not particularly limited.

The carbon nanotube may be a single-walled carbon nanotube or a multi-walled carbon nanotube.

The purity of the carbon nanotube is not particularly limited, and is preferably equal to or higher than 99% in the present invention.

The carbon nanotube generally contains an impurity such as Fe or Co, and metal such as Fe might be dissolved and precipitated to cause a failure such as a short-circuit.

When the purity is equal to or higher than 99%, occurrence of the failure can be avoided.

The average length of the carbon nanotube is not particularly limited, and for example, is preferably within a range of 5 to 20 μm in the present invention.

When the average length is 5 to 20 μm, particles of the second positive electrode active material can be coupled to each other by the carbon nanotube.

The diameter of the carbon nanotube is not particularly limited, and for example, is preferably within a range of 5 to 10 nm in the present invention.

When the diameter is 5 to 10 nm, the carbon nanotube is curved along a particle surface of the first positive electrode active material by shear force applied during manufacturing of the lithium-ion secondary battery positive electrode active material complex of the present invention, and therefore, electric conductivity of the electrode obtained using the complex can be improved.

[Amount of Coverage with Carbon Nanotube]

In the lithium-ion secondary battery positive electrode active material complex of the present invention, the amount of coverage of the first positive electrode active material with the carbon nanotube is preferably 1 to 1.5% by mass with respect to the total mass of the first positive electrode active material and the carbon nanotube.

In a case where the amount of coverage with the carbon nanotube with respect to the total mass of the first positive electrode active material and the carbon nanotube is less than 1% by mass, a region of contact between the first positive electrode active material and the carbon nanotube is narrower, and for this reason, it is difficult to obtain a resistance reduction effect.

On the other hand, in a case where the coverage amount exceeds 1.5% by mass, the ratio of the carbon nanotube in the total of the carbon and the carbon nanotube contained in the covering layer is high. For this reason, coupling of the second positive electrode active material particles by the carbon is insufficient, and the resistance of the obtained battery increases.

<Method for Manufacturing Lithium-Ion Secondary Battery Positive Electrode Active Material Complex>

The method for manufacturing the lithium-ion secondary battery positive electrode active material complex of the present invention is not particularly limited, and a well-known method can be employed for complex formation.

Examples of a complex formation method include a method in which the covering layer adheres or bonds to the first positive electrode active material surface by mechanical milling.

Alternatively, the processing may be performed by a method selected from a group consisting of mechanofusion, planetary mixing, and kneading.

In the case of mechanical milling, complex formation is performed by compression force or shear force generated between a blade and a hermetic container wall surface. Examples of a commercially-available apparatus used for mechanical milling may include MECHANOFUSION and NOBILTA manufactured by Hosokawa Micron Corporation and a hybridization system manufactured by Nara Machinery Co., Ltd.

In the case of performing complex formation by means of MECHANOFUSION manufactured by Hosokawa Micron Corporation, processing under conditions such as 4000 rpm×60 seconds is performed five times to obtain the lithium-ion secondary battery positive electrode active material complex of the present invention.

In the case of performing complex formation by kneading, a material for forming the covering layer and the first positive electrode active material are added to a solvent to form a slurry. By a spray dry method for drying the obtained slurry with hot air while spraying the slurry, a precursor layer to be the covering layer is formed on the first positive electrode active material surface, and thereafter, is fired. In this manner, the lithium-ion secondary battery positive electrode active material complex of the present invention can be obtained.

Note that by subsequent classification processing, a complex with a desired average particle size or particle distribution can be obtained.

<Lithium-Ion Secondary Battery Positive Electrode>

The lithium-ion secondary battery positive electrode of the present invention includes the above-described lithium-ion secondary battery positive electrode active material complex of the present invention.

As long as the lithium-ion secondary battery positive electrode includes the lithium-ion secondary battery positive electrode active material complex of the present invention, component parts, a shape, etc. are not particularly limited. Examples of the component parts, the shape, etc. include a configuration in which an electrode layer containing the lithium-ion secondary battery positive electrode active material complex of the present invention is stacked on a current collector.

[Electrode Layer]

As long as the electrode layer forming the lithium-ion secondary battery positive electrode of the present invention contains, as an essential component, the above-described lithium-ion secondary battery positive electrode active material complex of the present invention, other components are not particularly limited.

As the constituent component of the positive electrode of the lithium-ion secondary battery, a well-known component can be applied as necessary.

Examples of the other optional components include a conductive auxiliary agent, a binder, and a solid electrolyte. Examples of the conductive auxiliary agent may include acetylene black, a carbon nanotube, graphene, and a graphite particle. Examples of the binder include polyvinylidene fluoride (PVDF), polyvinylidene chloride (PVDC), polyethylene oxide (PEO), polypropylene oxide (PPO), and polyethylene oxide-propylene oxide copolymer (PEO-PPO).

The content of the other optional components other than the lithium-ion secondary battery positive electrode active material complex in the electrode layer forming the lithium-ion secondary battery positive electrode of the present invention is not particularly limited.

The content may be within a normal range for forming a positive electrode material for the lithium-ion secondary battery.

[Current Collector]

The current collector forming the lithium-ion secondary battery positive electrode of the present invention is not particularly limited, and a well-known current collector used for the lithium-ion secondary battery can be used.

Examples of the positive electrode current collector include aluminum (Al) foil, nickel (Ni) foil, iron (Fe) foil, stainless steel (SUS) foil, titanium (Ti) foil, and copper (Cu) foil. For example, the thickness of the positive electrode current collector is 1 to 20 μm, but is not limited to the above.

[Method for Manufacturing Lithium-Ion Secondary Battery Positive Electrode]

The method for manufacturing the lithium-ion secondary battery positive electrode of the present invention is not particularly limited, and a well-known method for manufacturing the positive electrode of the lithium-ion secondary battery can be applied. Examples of the method include a method in which electrode paste containing the lithium-ion secondary battery positive electrode active material complex of the present invention is applied onto the current collector and is rolled after drying.

As the method for applying the electrode paste to the current collector, a well-known method can be applied. Examples of the method include roller coating such as an applicator roll, screen coating, blade coating, spin coating, and bar coating.

Note that in the lithium-ion secondary battery positive electrode of the present invention, the electrode layer may be formed on at least one surface of the current collector, or may be formed on both surfaces.

Such formation can be selected as necessary depending on the type or structure of intended lithium-ion secondary battery.

(Thickness of Electrode Layer)

The thickness of the electrode layer formed on the current collector is not particularly limited, and can be designed as necessary according to required performance of the lithium-ion secondary battery.

For example, the thickness is preferably within a range of 20 μm to 1000 μm.

<Lithium-Ion Secondary Battery>

The lithium-ion secondary battery of the present invention includes the lithium-ion secondary battery positive electrode containing the lithium-ion secondary battery positive electrode active material complex of the present invention, a negative electrode, and an electrolyte.

[Negative Electrode]

The negative electrode applied to the lithium-ion secondary battery of the present invention is not particularly limited as long as the negative electrode functions as a negative electrode of a lithium-ion secondary battery.

From well-known materials which can form the electrode, one having a lower potential as compared to that of the lithium-ion secondary battery positive electrode of the present invention is selected so that an optional battery can be formed.

Examples of a negative electrode active material may include natural graphite, artificial graphite, hard carbon, activated carbon, Si, SiOx, Sn, and SnOx.

Component parts forming the negative electrode, the shape of the negative electrode, etc. are not particularly limited.

Examples of the component parts, the shape, etc. include a configuration in which an electrode layer containing the negative electrode active material is stacked on a current collector.

The negative electrode layer may be formed on at least one surface of the current collector, or may be formed on both surfaces.

Such formation can be selected as necessary depending on the type or structure of intended lithium-ion secondary battery.

The electrode layer to be the negative electrode may be mixed with an optional component other than the negative electrode active material, and examples of the optional component include a conductive auxiliary agent, a binder, and a solid electrolyte.

Examples of the conductive auxiliary agent may include acetylene black, VGCF, and a carbon nanotube.

Examples of the binder include polyvinylidene fluoride (PVDF), styrene butadiene rubber (SBR), and methylcellulose sodium (CMC)).

[Electrolyte]

The electrolyte forming the lithium-ion secondary battery of the present invention may be an electrolytic solution in the form of liquid or an electrolyte in the form of solid or gel. As long as the electrolyte can form the lithium-ion secondary battery, any electrolyte can be applied with no particular problem.

In a case where the electrolyte forming the lithium-ion secondary battery of the present invention is the electrolytic solution, examples of lithium salt to be used include $LiPF_6$, LiFSI, LiTFSI, LiBOB, LiDFP, and LiDFOB.

Examples of a solvent include ethylene carbonate (FC), propylene carbonate (PC), dimethyl carbonate (Lt), ethylmethyl carbonate (IC), diethyl carbonate (DEC), and γ-butyrolactone (γBL).

An additive can be added as necessary, and examples of the additive include vinylene carbonate (VC), fluoroethylene carbonate (EEC), propane sultone (PS), and propene sultone (PPS).

[Form of Battery]

The form of the lithium-ion secondary battery of the present invention is not particularly limited, and for examples, a required shape such as a pouch cell, a cylindrical shape, or a rectangular shape can be selected as necessary.

Any of a multilayer type and a winding type can be employed.

[Other Configurations]

As long as the lithium-ion secondary battery of the present invention includes, as an essential configuration, the lithium-ion secondary battery positive electrode containing the lithium-ion secondary battery positive electrode active material complex of the present invention, the negative electrode, and the electrolyte, the lithium-ion secondary battery can include other configurations as necessary.

Examples of the other configurations include a separator, a positive electrode tab lead, a negative electrode tab lead, and a laminate film.

As these optional component members, well-known members applicable to the lithium-ion secondary battery can be applied.

[Method for Manufacturing Lithium-Ion Secondary Battery]

The method for manufacturing the lithium-ion secondary battery of the present invention is not particularly limited, and a well-known method for manufacturing the lithium-ion secondary battery can be applied.

EXAMPLES

Examples etc. of the present invention will be described below, but the present invention is not limited to these examples etc.

<Production of Lithium-Ion Secondary Battery Positive Electrode Active Material Complex A>

NCM181 ($LiNi_{0.8}Co_{0.1}Mn_{0.1}O_2$) (an average particle size: 6 μm) was prepared as a first positive electrode active material, 2.0% by mass of a carbon coat LVPF ($LiVPO_4F$)

(an average particle size: 0.1 μm) was prepared as a second positive electrode active material, and a carbon nanotube (CNT) (a fiber length: <10 μm, a diameter: 9.5 nm, a purity: 99.99%) was prepared.

The first positive electrode active material:the second positive electrode active material:CNT=90:9:1 was, in terms of % by mass, injected into a product name MECHANO-FUSION manufactured by Hosokawa Micron Corporation, and processing at 4000 rpm for 60 seconds was performed five times. In this manner, a lithium-ion secondary battery positive electrode active material complex A was obtained.

<Production of Lithium-Ion Secondary Battery Positive Electrode Active Material Complex B>

A lithium-ion secondary battery positive electrode active material complex B was obtained by an operation similar to that for the lithium-ion secondary battery positive electrode active material complex A, except that the first positive electrode active material:the second positive electrode active material:CNT was 80:18.5:1.5 in terms of % by mass.

<Production of Lithium-Ion Secondary Battery Positive Electrode Active Material Complex C>

A lithium-ion secondary battery positive electrode active material complex C was obtained by an operation similar to that for the lithium-ion secondary battery positive electrode active material complex A, except that the first positive electrode active material:the second positive electrode active material:CNT was 97:2:1 in terms of % by mass.

<Production of Lithium-Ion Secondary Battery Positive Electrode Active Material Complex D>

NCM811 ($LiNi_{0.8}Co_{0.1}Mn_{0.1}O_2$) (an average particle size: 6 μm) was prepared as a first positive electrode active material, and a carbon nanotube (CNT) (a fiber length: <10 μm, a diameter: 9.5 nm, a purity: 99.99%), lithium fluoride (LiF), vanadium pentoxide ($V_2O_5$), ammonium dihydrogenphosphate ($NH_4HPO_4$), polyvinylidene fluoride (PVDF), stearic acid, and N-methyl-2-pyrrolidone (NMP) were prepared.

The first positive electrode active material:LiF:$V_2O_5$: $NH_4H_2PO_4$:PVDF:the stearic acid:NMP:CNT=79.6:1.3:4.4: 5.6:3.4:0.6:4.2:0.9 was, in terms of % by mass, injected into a planetary mixer and was mixed, and in this manner, a uniform slurry was obtained.

By a spray dry method for drying the obtained slurry with hot air at 200° C. while spraying the obtained slurry by means of a spray drier, granulated particles were obtained. Further, the obtained granulated particles were fired at 650° C. for one hour in an Ar air flow, and accordingly, a covering layer was formed on the first positive electrode active material during production of carbon-coated LVPF (LiVPO$_4$F) as a second positive electrode active material. In this manner, a lithium-ion secondary battery positive electrode active material complex D was obtained.

The obtained lithium-ion secondary battery positive electrode active material complex D is a complex configured such that the covering layer containing the carbon-coated LVPF (LiVPO$_4$F) as the second positive electrode active material and the carbon nanotube is formed on a surface of the NCM811 as the first positive electrode active material.

Example 1

[Production of Lithium-Ion Secondary Battery Positive Electrode]

95% by mass of the lithium-ion secondary battery positive electrode active material complex A, 2% by mass of a carbon material as a conductive agent, and 3% by mass of polyvinylidene fluoride (PVDF) as a binder were mixed, and the obtained mixture was dispersed in an appropriate amount of N-methyl-2-pyrrolidone (NMP). In this manner, a slurry was produced.

Aluminum foil with a thickness of 15 μm was prepared as a current collector, and the produced slurry was applied to the current collector such that an application amount is 21.2 mg/cm$^2$ and was dried at 100° C. for 10 minutes. In this manner, a positive electrode layer was formed on the current collector, and was pressed to a predetermined thickness. Consequently, a lithium-ion secondary battery positive electrode was formed.

[Production of Lithium-Ion Secondary Battery Negative Electrode]

97% by mass of natural graphite, 1% by mass of a carbon material as a conductive agent, 1% by mass of styrene butadiene rubber (SBR) as a binder, and 1% by mass of methylcellulose sodium (CM) as a thickening agent were mixed, and the obtained mixture was dispersed in an appropriate amount of distilled water. In this manner, a slurry was produced.

Copper foil with a thickness of 8 pnm was prepared as a current collector, and the produced slurry was applied to the current collector such that an application amount is 12.3 mg/cm$^2$ and was dried at 100° C. for 10 minutes. In this manner, a negative electrode layer was formed on the current collector, and was pressed to a predetermined thickness. Consequently, a lithium-ion secondary battery negative electrode was formed.

[Production of Lithium-Ion Secondary Battery]

A multilayer body configured such that a separator is sandwiched between the positive and negative electrodes produced as described above was introduced into a container processed into a bag shape by thermal sealing of a secondary battery aluminum laminate (manufactured by Dai Nippon Printing Co., Ltd.), and after an electrolytic solution had been injected into each electrode interface, was depressurized to −95 kPa and was sealed. In this manner, a lithium-ion secondary battery was produced.

As the separator, a polyethylene microporous film coated with alumina particles of about 5 μm on one surface was used.

1.2 mol/L of LiPF$_6$ was dissolved in a solvent obtained by mixing of ethylene carbonate, ethylmethyl carbonate, and dimethyl carbonate in a volume ratio of 30:30:40, and the resultant was used as the electrolytic solution.

Example 2

[Production of Lithium-Ion Secondary Battery]

A lithium-ion secondary battery was produced similarly to Example 1, except that the lithium-ion secondary battery positive electrode active material complex B was used.

Example 3

[Production of Lithium-Ion Secondary Battery]

A lithium-ion secondary battery was produced similarly to Example 1, except that the lithium-ion secondary battery positive electrode active material complex C was used.

Example 4

[Production of Lithium-Ion Secondary Battery]

A lithium-ion secondary battery was produced similarly to Example 1, except that the lithium-ion secondary battery positive electrode active material complex D was used.

Comparative Example 1

[Production of Lithium-Ion Secondary Battery Positive Electrode]

NCM811 (LiNi$_{0.8}$Co$_{0.1}$Mn$_{0.1}$O$_2$) (an average particle size: 6 μm) was prepared as a first positive electrode active material, 2.0% by mass of a carbon coat LVPF (LiVPO$_4$F) (an average particle size: 4.5 μm) was prepared as a second positive electrode active material, and a carbon nanotube (CNT) (a fiber length: <10 μm, a diameter: 9.5 nm, a purity: 99.99%) was prepared.

A mixture of the first positive electrode active material:the second positive electrode active material:CNT=90:9:1 was produced in terms of % by mass, and 95% by mass of the obtained mixture, 2% by mass of a carbon material as a conductive agent, and 3% by mass of polyvinylidene fluoride (PVDF) as a binder were mixed and were dispersed in an appropriate amount of N-methyl-2-pyrrolidone (NMP). In this manner, a slurry was produced.

Using the obtained slurry, a lithium-ion secondary battery positive electrode was produced similarly to Example 1.

[Production of Lithium-Ion Secondary Battery]

A lithium-ion secondary battery was produced similarly to Example 1, except that the lithium-ion secondary battery positive electrode obtained as described above was used.

Comparative Example 2

[Production of Lithium-Ion Secondary Battery Positive Electrode]

NCM1811 (LiNi$_{0.8}$Co$_{0.1}$Mn$_{0.1}$O$_2$) (an average particle size: 6 μm) was prepared as a first positive electrode active material, 1.5% by mass of a carbon coat LMFP (LiMn$_{0.7}$Fe$_{0.3}$PO$_4$) (an average particle size: 5 μm) was prepared as a second positive electrode active material, and a carbon nanotube (CNT) (a fiber length: <10 μm, a diameter: 9.5 nm, a purity: 99.99%) was prepared.

A mixture of the first positive electrode active material:the second positive electrode active material:CNT=90:9:1 was produced in terms of % by mass, and 95% by mass of the obtained mixture, 2% by mass of a carbon material as a conductive agent, and 3% by mass of polyvinylidene fluoride (PVDF) as a binder were mixed and were dispersed in an appropriate amount of N-methyl-2-pyrrolidone (NMP). In this manner, a slurry was produced.

[Production of Lithium-Ion Secondary Battery]

A lithium-ion secondary battery was produced similarly to Example 1, except that the lithium-ion secondary battery positive electrode obtained as described above was used.

Evaluation

The following evaluation was made for the lithium-ion secondary batteries obtained in the examples and the comparative examples. Results are shown in Table 1.

[Initial Discharge Capacity]

The produced lithium-ion secondary battery was left at a measurement temperature (25° C.) for one hour, constant current charging was performed with 8.4 mA until 4.2 V, constant voltage charging was subsequently performed with a voltage of 4.2 V for one hour, and the lithium-ion secondary battery was left for 30 minutes. Thereafter, constant current discharging was performed with a current value of 8.4 mA until 2.5 V, and then, the lithium-ion secondary battery was left for 30 minutes.

The above-described process was repeated five times, and a discharge capacity at the fifth discharging was taken as an initial discharge capacity.

Results are shown in Tables 1 to 3.

Note that a current value which can complete discharging of the obtained discharge capacity in one hour was 1 C.

[Initial Cell Resistance]

The lithium-ion secondary battery after measurement of the initial discharge capacity was charged with 0.2 C after having been left at the measurement temperature (25° C.) for one hour, and was left for 10 minutes after a charge level (state of charge (SOC)) had been adjusted to 50%.

Next, pulse discharging was performed with a C-rate of 0.5 C for 10 seconds, and a voltage after discharging for 10 seconds was measured. After the lithium-ion secondary battery had been left for 10 minutes, auxiliary charging was performed such that the lithium-ion secondary battery regains a SOC of 50%. Thereafter, the lithium-ion secondary battery was further left for 10 minutes.

The above-described operation was performed for each C-rate of 1.0 C, 1.5 C, 2.0 C, 2.5 C, and 3.0 C. The voltage after discharging for 10 seconds was plotted against the current value at each C-rate, the horizontal axis being the current value and the vertical axis being the voltage.

Then, the slope of an approximation line obtained from each plot by a least-square method was taken as the internal resistance of the lithium-ion secondary battery.

[Discharge Capacity after Endurance]

The operation of performing constant current discharging with a discharge rate of 2 C until 2.5 V after constant current charging has been performed with a charge rate of 1 C until 4.2 V in a thermostatic tank at 45° C. was taken as a single cycle, and 100 cycles of the above-described operation were repeated as a charge/discharge cycle endurance test.

After the end of 1000 cycles, the lithium-ion secondary battery was left for 24 hours in a state in which the thermostatic tank was changed to 25° C. Thereafter, constant current charging was performed with 0.2 C until 4.2 V, constant voltage charging was subsequently performed with a voltage of 4.2 V for one hour, and the lithium-ion secondary battery was left for 30 minutes. Thereafter, constant current discharging was performed with a discharge rate of 0.2 C until 2.5 V, and a discharge capacity after endurance was measured.

[Cell Resistance after Endurance]

The lithium-ion secondary battery after measurement of the discharge capacity after endurance was charged such that the state of charge (SOC) reaches 50% as in measurement of the initial cell resistance, and a cell resistance after endurance was obtained by a method similar to that for measuring the initial cell resistance.

[Capacity Maintenance Rate]

The percentage of the discharge capacity after endurance with respect to the initial discharge capacity measured as described above was obtained, and was taken as a capacity maintenance rate after endurance.

[Cell Resistance Increase Rate]

The percentage of the cell resistance after endurance with respect to the initial cell resistance measured as described above was obtained, and was taken as a cell resistance increase rate.

TABLE 1

| | Example 1 | Example 2 | Example 3 | Example 4 | Comparative Example 1 | Comparative Example 2 |
|---|---|---|---|---|---|---|
| Type of Lithium-Ion Secondary Battery Positive Electrode Active Material | A | B | C | D | — | — |
| First Positive Electrode Active Material | 90.0 | 80.0 | 97.0 | 90.0 | 90.0 | 90.0 |
| Second Positive Electrode Active Material | 9.0 | 18.5 | 2.0 | 9.0 | 9.0 | 9.0 |
| Carbon Nanofiber | 1.0 | 1.5 | 1.0 | 1.0 | 1.0 | 1.0 |
| Coverage with Second Positive Electrode Active Material | 9.0 | 18.5 | 2.0 | 9.0 | 9.0 | 9.0 |
| Coverage with Carbon Nanofiber (% by mass) | 1.0 | 1.5 | 1.0 | 1.0 | 1.0 | 1.0 |
| Initial Performance — Discharge Capacity [mAh] | 52.0 | 48.0 | 54.0 | 51.4 | 50.0 | 50.0 |
| Initial Performance — Initial Cell Resistance Value [Ω] | 1.08 | 1.05 | 1.15 | 1.09 | 1.11 | 1.27 |
| Performance after Endurance — Discharge Capacity [mAh] | 44.2 | 39.8 | 44.6 | 43.4 | 41.0 | 40.5 |
| Performance after Endurance — Cell Resistance Value after Endurance [Ω] | 1.67 | 1.75 | 1.62 | 1.72 | 2.21 | 2.30 |
| Capacity Maintenance Rate after Endurance (%) | 85.0 | 83.0 | 82.5 | 84.5 | 82.0 | 81.0 |
| Resistance Increase Rate after Endurance (%) | 154.6 | 166.7 | 140.9 | 157.8 | 199.1 | 181.1 |

What is claimed is:

1. A positive electrode active material complex for forming a positive electrode of a lithium-ion secondary battery, comprising:
    a first positive electrode active material; and
    a covering layer covering the first positive electrode active material,
    wherein the first positive electrode active material is a lithium transition metal complex oxide containing nickel,
    the covering layer contains a second positive electrode active material and a carbon nanotube, and
    the second positive electrode active material is at least one selected from a group consisting of LiVP$_2$O$_7$ and LiVPO$_4$F, on a surface of which carbon is carried.

2. The lithium-ion secondary battery positive electrode active material complex according to claim 1, wherein the first positive electrode active material is lithium nickel cobalt-based oxide represented by formula (1):

$$LiNi_xCo_yM_zO_2 \qquad (1)$$

where M is at least one selected from Mn, Al, Mg, and W, x+y+z=1, 0.6≤x<1, 0.02≤y≤0.2, and 0.02≤z≤0.2.

3. A lithium-ion secondary battery positive electrode comprising:
    the lithium-ion secondary battery positive electrode active material complex according to claim 1.

4. A lithium-ion secondary battery comprising:
    a lithium-ion secondary battery positive electrode containing the lithium-ion secondary battery positive electrode active material complex according to claim 1;
    a negative electrode; and
    an electrolyte.

* * * * *